3,061,643
ACETOACET-TOLUIDIDES AND ANISIDIDES
Chester E. Pawloski, Bay City, Mich., assignor to The
Dow Chemical Company, Midland, Mich., a corporation of Delaware
No Drawing. Filed Mar. 23, 1961, Ser. No. 97,741
3 Claims. (Cl. 260—562)

This invention is directed to the acetoacet-toluidides and anisidides corresponding to the formula

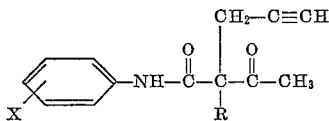

In this and succeeding formulae, X represents methyl or methoxy and R represents hydrogen or propargyl. These compounds are crystalline solid materials which are somewhat soluble in any common organic solvents and of low solubility in water. The compounds are useful as herbicides and parasiticides for the control of the growth and killing of many plant, insect, mite, bacterial and fungal species such as aphids, worms, beetles, wild oats and Elodea.

The new acetoacet-toluidides and anisidides are prepared by reacting propargyl chloride or propargyl bromide with an acetoacet-anisidide or toluidide corresponding to the formula

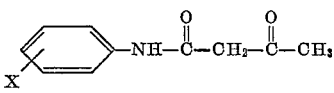

The reaction is carried out in a reaction medium such as acetone, diethyl ether, benzene or pentane, and in the presence of a basic material such as an alkali metal carbonate. The reaction takes place smoothly at the temperature range of from about 34°–100° C. with the production of the desired product and halide of reaction. This halide appears in the reaction mixture as the salt of the metal in the employed base. Good results are obtained when reacting about one molecular proportion of acetoacet-anisidide or toluidide with about one molecular proportion of propargyl halide in the presence of about one molecular proportion of the basic material or halide acceptor. When optimum yields of 2,2-dipropargyl acetoacet-anisidide or toluidide are desired, it is preferred to react at least two molecular proportions of propargyl halide with one molecular proportion of acetoacet-anisidide or toluidide. For optimum yields of 2-propargyl acetoacet-anisidide or toluidide, substantially equimolecular proportions of propargyl halide and acetoacet-anisidide or toluidide are employed. In such preferred operations, the halide acceptor is employed in an amount substantially equimolecular with the employed amount of propargyl halide. Upon completion of the reaction, the desired product may be separated in conventional procedures such as washing with water, filtration and decantation.

In carrying out the reaction the acetoacet-anisidide or toluidide, propargyl halide and halide acceptor are dispersed in the reaction medium and the resulting mixture maintained with stirring for a period of time at a temperature of from 40° to 100° C. to complete the reaction. The reaction mixture conveniently is then washed with water, excess reaction medium removed by evaporation or distillation and the residue filtered to obtain the desired product as a crystalline residue.

The following examples merely illustrate the invention and are not to be construed as limiting.

*Example 1.—2-Propargyl Acetoacet-o-Toluidide*

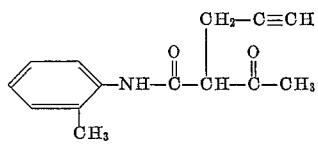

Acetoacet-o-toluidide (66 grams; 0.35 mole), 50 grams (0.4 mole) of propargyl bromide and 56 grams (0.4 mole) of potassium carbonate were dispersed in 300 milliliters of acetone and the resulting mixture heated with stirring at the boiling temperature and under reflux for 40 hours. The reaction mixture was then washed with water and a portion of the reaction solvent removed by distillation. The concentrated mixture was then filtered to obtain 2-propargyl acetoacet-o-toluidide product as a crystalline solid melting at 93°–95° C.

*Example 2.—2,2-Dipropargyl Acetoacet-o-Anisidide*

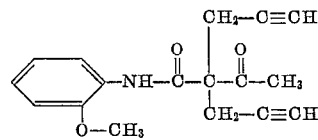

Acetoacet-o-anisidide (100 grams; 0.48 mole), 65 grams (0.5 mole) of propargyl bromide and 72 grams (0.5 mole) of potassium carbonate was dispersed in 300 milliliters of acetone and the resulting mixture heated with stirring at the boiling temperature and under reflux for 24 hours. The reaction mixture was then washed with water and low boiling constituents removed from the washed mixture by fractional distillation under reduced pressure. The concentrated reaction mixture was then filtered to separate a 2,2-dipropargyl acetoacet-o-anisidide product as a crystalline solid melting at 82°–83° C. and having carbon and hydrogen contents of 72.23 percent and 6.40 percent as compared to theoretical contents of 72.074 percent and 6.048 percent, respectively.

In a similar manner, other products of the present invention are prepared as follows:

2,2-dipropargyl acetoacet-p-toluidide by reacting together acetoacet-p-toluidide and propargyl chloride.

2-propargyl acetoacet-m-anisidide by reacting together acetoacet-m-anisidide and propargyl bromide.

2-propargyl acetoacet-p-toluidide by reacting together acetoacet-p-toluidide and propargyl chloride.

2,2-dipropargyl acetoacet-m-toluidide by reacting together acetoacet-m-toluidide and propargyl chloride.

2,2-dipropargyl acetoacet-p-anisidide by reacting together acetoacet-p-anisidide and propargyl bromide.

The novel products of the present invention are useful as parasiticides for the control of a number of pests and the inhibition of the growth of a number of weed and plant species. For such uses, the products are dispersed on an inert finely divided solid and employed as ducts. Such mixtures also may be dispersed in water with or without the aid of a surface active agent, and the resulting aqueous suspensions employed as sprays. In other procedures, the products are employed as active constituents in solvent solutions, oil-in-water or water-in-oil emulsions, or aqueous dispersions. In representative operations, aqueous compositions containing 500 parts per million by weight of 2-propargyl acetoacet-o-anisidide give 100 percent kills of bean aphids.

I claim:

1. A compound corresponding to the formula

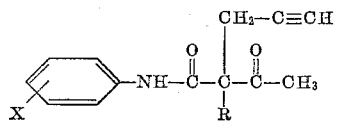

wherein X represents a member of the group consisting of methyl and methoxy and R represents a member of the group consisting of hydrogen and propargyl.

2. 2-propargyl acetoacet-o-toluidide.
3. 2,2-dipropargyl acetoacet-o-anisidide.

No references cited.